United States Patent
Klomp

(10) Patent No.: US 9,598,628 B2
(45) Date of Patent: Mar. 21, 2017

(54) METHOD FOR INHIBITING THE PLUGGING OF CONDUITS BY GAS HYDRATES

(71) Applicant: SHELL OIL COMPANY, Houston, TX (US)

(72) Inventor: Ulfert Cornelis Klomp, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 332 days.

(21) Appl. No.: 14/366,490

(22) PCT Filed: Dec. 17, 2012

(86) PCT No.: PCT/US2012/070103
§ 371 (c)(1),
(2) Date: Jun. 18, 2014

(87) PCT Pub. No.: WO2013/096201
PCT Pub. Date: Jun. 27, 2013

(65) Prior Publication Data
US 2015/0126413 A1  May 7, 2015

Related U.S. Application Data

(60) Provisional application No. 61/577,818, filed on Dec. 20, 2011.

(51) Int. Cl.
*C09K 8/52* (2006.01)
*C10L 3/10* (2006.01)

(52) U.S. Cl.
CPC .............. *C09K 8/52* (2013.01); *C10L 3/108* (2013.01); *C09K 2208/22* (2013.01); *C10L 2230/14* (2013.01); *C10L 2250/04* (2013.01); *C10L 2270/10* (2013.01)

(58) Field of Classification Search
None
See application file for complete search history.

(56) References Cited

U.S. PATENT DOCUMENTS

| 5,879,561 | A | 3/1999 | Klomp et al. |
| 6,152,993 | A | 11/2000 | Klomp |
| 6,905,605 | B2 * | 6/2005 | Klomp ............ C10L 3/00 137/13 |
| 2003/0057158 | A1 | 3/2003 | Klomp |
| 2005/0261529 | A1 * | 11/2005 | Crosby ............ C10L 3/107 585/15 |

FOREIGN PATENT DOCUMENTS

| CN | 101861343 | 10/2010 |
| DE | 102009030339 A1 | 1/2011 |
| EP | 1017925 A1 | 7/2000 |
| EP | 1306401 A1 | 5/2003 |
| EP | 1036106 B1 | 8/2003 |
| WO | 0056804 A1 | 9/2000 |
| WO | 0058388 A1 | 10/2000 |
| WO | 03037959 A1 | 5/2003 |
| WO | 2007098888 A1 | 9/2007 |
| WO | 2007144189 A2 | 12/2007 |

OTHER PUBLICATIONS

PCT International Search Report, Application No. PCT/US2012/070103 dated Mar. 18, 2013.

* cited by examiner

*Primary Examiner* — Alicia Bland

(57) ABSTRACT

A method for inhibiting the plugging of a conduit containing a flowable mixture comprising at least an amount of hydrocarbons capable of forming hydrates in the presence of water and an amount of water, which method comprises adding to the mixture an amount of a functionalized dendrimer effective to inhibit formation and/or accumulation of hydrates in the mixture at conduit temperatures and pressures; and flowing the mixture containing the functionalized dendrimer and any hydrates through the conduit wherein the functionalized dendrimer comprises two or more functional end groups selected from the group consisting of non-cyclic tertiary amine functional end groups, quaternary ammonium functional end groups, polyalkylene glycol functional end groups, quaternary ammonium zwitterionic end groups and phosphate or sulfate end groups.

6 Claims, No Drawings

METHOD FOR INHIBITING THE PLUGGING OF CONDUITS BY GAS HYDRATES

PRIORITY CLAIM

The present application is a National Stage (§371) application of PCT/US2012/070103, filed Dec. 17, 2012, which claims priority from U.S. Provisional Application 61/577,818, filed Dec. 20, 2011, each of which are hereby incorporated by reference in their entirety.

FIELD OF THE INVENTION

The present invention relates to a method for inhibiting the plugging by gas hydrates of conduits containing a mixture of low-boiling hydrocarbons and water.

BACKGROUND OF THE INVENTION

Low-boiling hydrocarbons, such as methane, ethane, propane, butane, and iso-butane, are normally present in conduits that are used for the transport and processing of natural gas and crude oil. When varying amounts of water are also present in such conduits the water/hydrocarbon mixture is, under conditions of low temperature and elevated pressure, capable to form gas hydrate crystals. Gas hydrates are clathrates (inclusion compounds) in which small hydrocarbon molecules are trapped in a lattice consisting of water molecules. As the maximum temperature at which gas hydrates can be formed strongly depends on the pressure of the system, hydrates are markedly different from ice.

The structure of the gas hydrates depends on the type of the gas forming the structure: methane and ethane form cubic lattices having a lattice constant of 1.2 nm (normally referred to as structure I) whereas propane and butane from cubic lattices having a lattice constant of 1.73 nm (normally referred to as structure II). It is known that even the presence of a small amount of propane in a mixture of low-boiling hydrocarbons will result in the formation of type II gas hydrates which type is therefore normally encountered during the production of oil and gas. It is also known that compounds like methyl cyclopentane, benzene and toluene are susceptible of forming hydrate crystals under appropriate conditions, for example in the presence of methane. Such hydrates are referred to as having structure H.

Gas hydrate crystals, which grow inside a conduit, such as a pipeline, are known to be able to block or even damage the conduit. In order to cope with this undesired phenomenon, a number of remedies have been proposed in the past such as removal of free water, maintaining elevated temperatures and/or reduced pressures or the addition of chemicals such as melting point depressants (antifreezes). Melting point depressants, typical examples of which are methanol and various glycols, often have to be added in substantial amounts, typically in the order of several tens of percent by weight of the water present, in order to be effective. This is disadvantageous with respect to costs of the materials, their storage facilities and their recovery, which is rather expensive.

Another approach to keep the fluids in the conduits flowing is taken by adding crystal growth inhibitors and/or compounds, which are in principle capable of preventing agglomeration of hydrate crystals. Compared to the amounts of antifreeze required, already small amounts of such compounds are normally effective in preventing the blockage of a conduit by hydrates. The principles of interfering with crystal growth and/or agglomeration are known.

U.S. Pat. No. 6,905,605 describes a method for inhibiting the plugging of a conduit containing a flowable mixture comprising at least an amount of hydrocarbons capable of forming hydrates in the presence of water and an amount of water, which method comprises adding to the mixture an amount of a dendrimeric compound effective to inhibit formation and/or accumulation of hydrates in the mixture at conduit temperatures and pressures; and flowing the mixture containing the dendrimeric compound and any hydrates through the conduit.

Some of the hydrate inhibitors described above have properties that are undesirable under certain circumstances. For example, some of the hydrate inhibitors have a low cloud point temperature. Above the cloud point temperature the solubility of these polymeric inhibitors in water decreases drastically which can result in the precipitation of sticky polymer masses.

It would be advantageous to develop hydrate inhibitors that have a high enough cloud point so that the inhibitor does not become cloudy (begin to precipitate solids) under conditions where the hydrate inhibitors are used.

SUMMARY OF THE INVENTION

The invention provides a method for inhibiting the plugging of a conduit containing a flowable mixture comprising at least an amount of hydrocarbons capable of forming hydrates in the presence of water and an amount of water, which method comprises adding to the mixture an amount of a functionalized dendrimer effective to inhibit formation and/or accumulation of hydrates in the mixture at conduit temperatures and pressures; and flowing the mixture containing the functionalized dendrimer and any hydrates through the conduit wherein the functionalized dendrimer comprises two or more functional end groups selected from the group consisting of non-cyclic tertiary amine functional end groups, quaternary ammonium functional end groups, polyalkylene glycol functional end groups, quaternary ammonium zwitterionic end groups and phosphate or sulfate end groups.

DETAILED DESCRIPTION OF THE INVENTION

The present invention relates to the field of hydrate inhibitors comprising functionalized dendrimer compounds with improved properties that are suitable for use in inhibiting the plugging of a conduit. A preferred embodiment of functionalized dendrimers is hyper-branched polyester amides.

Hyper-branched polyester amides are available commercially from DSM under the registered trademark Hybrane® in a variety of different types that comprise different functional groups. Whilst many generic types of such hyper-branched polymers exist, they are not all suitable for all applications. It would be desirable to find hyper-branched polymers which are particularly suitable for hydrate inhibition.

It is a preferred object of the invention to solve some or all of the problems identified herein.

Certain hyper-branched polyester amides having a cloud point value above a minimum value (as tested under the conditions defined herein) are especially useful for inhibiting hydrates. Therefore broadly in accordance with the present invention there is provided a hyper-branched polyester amide having a cloud point of at least one of the values described herein (such as at least 50° C.) where the polyester amide comprises at least one end group thereon selected from:

two or more, preferably three or more most preferably four or more of any of the following end groups from types (i) to (iv)

i) tertiary amine functional end groups (also denoted herein as (t-amine or A groups)

ii) quaternary ammonium functional end groups (also denoted herein as Q groups) preferably comprising tertiary amine groups that are protonated iii) polyalkylene glycol functional end groups (also denoted herein as E groups), preferably polypropylene glycol and/or polyethylene glycol, more preferably polyethylene glycol groups (also denoted herein as EO groups); and iv) quaternary ammonium zwitterionic end groups, i.e., comprising zwitterions that have an anionic group (preferably carboxylate) attached to a positively charged nitrogen atom, more preferably betaine functional end groups (also denoted herein as BQ), v) additional polar (anionic) end groups such as phosphates, sulfates etc. and/or any mixtures and/or combinations thereof whether on the same or different macromolecule that comprises the polyester amide.

Hyper-branched polyester amides of the present invention have a cloud point of at least 50° C., conveniently at least 55° C., preferably at least 60° C., more preferably at least 80° C., most preferably at least 90° C., in particular at least 100° C. as measured in one or more of the tests described herein with demineralized water (DMW) and/or in salt solution (such as that described herein as BRINE). Conveniently polyester amides of the present invention have a cloud point value of at least one of the previously described values in at least one of DMW and BRINE, more conveniently in BRINE, most conveniently in both DMW and BRINE.

Where the polyester amides of the invention are hyper-branched polymers they may be prepared by the methods described one or more of the publications below (and combinations thereof) and/or have structures as described thereto. The contents of these documents are incorporated by reference. It will be appreciated that the core structure of the polyester amide can be formed as described in any of the known ways described on the documents below that are otherwise consisted with the invention herein. The present invention relates to novel and improved polyester amides due to the nature of the end groups thereon and the core structure is less critical to the advantageous properties described herein.

In one embodiment of the invention the hyper-branched polyester amides may comprise, as a core structure, a moiety obtained or obtainable from polycondensation reaction between a one or more dialkanolamines and more or more cyclic anhydrides. Optionally further end groups may be attached to the core structure as described herein.

The cyclic anhydride used to prepare the hyper-branched polyester amides of the invention may comprise at least one of: succinic anhydride, $C_1$-$C_{18}$ alkylsuccinic anhydrides, $C_1$-$C_{18}$ alkenylsuccinic anhydrides, polyisobutenylsuccinic anhydride, phthalic anhydride, cyclohexyl-1,2-dicarboxylic anhydride, cyclohexen-3,4-yl-1,2-dicarboxylic anhydride and/or a mixture of two or more thereof.

Another aspect of the present invention provides a composition comprising a hyper-branched polyester amide of the invention as described herein together with a diluent, conveniently water. Preferably the polyester amide is present in the composition in an amount of from 0.1% to 50%, more preferably 0.1% to 10%, and most preferably 0.1% to 5% by weight percentage of the total composition.

Hyper-branched polymers are polymers, which contain a large number of branching sites. Compared to conventional linear polymers which only contain two end groups, hyper-branched polymers possess a large number of end groups, for example on average at least five end groups, preferably on average at least eight end groups per macromolecule. Hyper-branched polyester amides can be produced by polycondensation of dialkanolamines and cyclic anhydrides with optional modification of the end groups, as described in EP1036106, EP1306401, WO 00/58388, WO 00/56804 and/or WO07/098888.

The chemistry of the polyester amides allows the introduction of a variety of functionalities, which can be useful to give the polyester amides other additional properties. Preferred functional end groups comprise (for example are) —OH, —COOH, —$NR_1R_2$, where $R_1$ and $R_2$ can be the same or different $C_{1-22}$ alkyl, —OOC—R or —COOR, where R is an alkyl or aralkyl group. Other possible end groups are derived from polymers, silicones or fluoropolymers. Still other end groups are derived from cyclic compounds, e.g. piperidine, morpholine and/or derivatives thereof. Hyper-branched polyester amides with these functionalities may be produced by any suitable method. For example carboxy functional hyper-branched polyester amide polymers are described in WO 2000/056804. Dialkyl amide functional hyper-branched polyester amide polymers are described in WO 2000/058388. Ethoxy functional hyper-branched polyester amide polymers are described in WO 2003/037959. Hetero functionalised hyper-branched polyester amides are described in WO 2007/090009. Secondary amide hyper-branched polyester amides are described in WO 2007/144189. It is possible, and often even desirable, to combine a number of different end group functionalities in a single hyper-branched polyester amide molecule in order to obtain desirable properties of the polymer.

The properties of a hyper-branched polyester amide may be modified by selecting the cyclic anhydride used to build up the polymer structure. Preferred cyclic anhydrides are succinic anhydride, alkylsuccinic anhydrides (where the length of the alkyl chain can vary from $C_1$ to $C_{18}$), alkenyl-succinic anhydrides (where the length of the alkenyl chain can vary from $C_1$ to $C_{18}$), polyisobutenylsuccinic anhydride, phthalic anhydride, cyclohexyl-1,2-dicarboxylic anhydride, cyclohexen-3,4-yl-1,2-dicarboxylic anhydride and other cyclic anhydrides. Especially preferred are succinic anhydride and cyclohexyl-1,2-dicarboxylic anhydride. It is possible to combine more than one type of anhydride to produce a hyper-branched polyester amide with the desired additional properties.

Additionally the anhydride can be replaced by the corresponding dicarboxylic acid to obtain the same product as e.g. succinic anhydride can be partly replaced by succinic acid.

In one embodiment the polyester amides of the invention may be obtained by both a cyclic anhydride and a diacid used together in the same process. Preferably the diacid is derived from the cyclic anhydride. A preferred weight percentage for the amount of anhydride is from 1 to 99%, more preferably from 10 to 90%, most preferably from 20 to 80% with respect to the total weight of anhydride and diacid. A preferred weight percentage of diacid is from 1 to 99%, more preferably from 10 to 90%, most preferably from 20 to 80% with respect to the total weight of anhydride and diacid. The structure and properties of the polyester amides can be varied over a broad range of polarities and interfacial properties. This makes the hyper-branched polyester amides applicable to solve hydrate problems where water soluble polymers are required at high temperature and/or brine.

A further aspect of the invention broadly provides a use of a polyester amide (preferably hyper-branched polyester amide) in inhibiting hydrate formation.

Hyper-branched polyester amides that may be used in the present invention are preferably water soluble and may be optionally soluble in most organic solvents. A further yet still other aspect of the invention broadly provides for use of polyester amide (preferably hyper-branched polyester amide) as described herein in any of the methods of the invention described herein.

The process of the present invention may use hyper-branched polyester amides alone or in combinations or formulations with other active ingredients as necessitated by specific applications. Examples of other compounds with specific activity are corrosion inhibitors, antifoaming agents, biocides, detergents, rheology modifiers and other functions as made necessary by the application. Application of the hyper-branched polyester amide in the process according to the invention may be as solid or liquid, or dissolved in a solvent that can be chosen by those skilled in the art.

Preferably the polyester amides and/or used in the present invention are substantially non-linear, non-cyclic branched macromolecules (such as polymers) having three or more polymeric centers, more preferably having a molecular weight of at least 100. Usefully the polyester amides are three dimensional hyper-branched polymers, star-shaped polymers or dendrimeric macro-molecules.

Suitable apolar groups (end groups) may be optionally substituted hydrocarbon groups comprising at least 4 carbon atoms.

Preferred polyester amides of and/or used in the present invention comprise those in which the (average) ratio of polar groups to apolar groups is from about 1.1 to about 20, more preferably from 1.2 to 10, most preferably from 1.5 to 8.0. These ratios may be weight ratios and/or molar ratios, preferably are weight ratios.

Hyper-branched polyester amides of and/or used in the present invention may obtained and/or obtainable from: at least one organo building block and at least one tri (or higher) organo valent branching unit, where the at least one building block is capable of reacting with the at least one branching unit; and at least one or the building block and/or the branching unit (conveniently the branching unit) comprises an end group comprising a polar moiety.

More preferred hyper-branched polyester amides of and/or used in the present invention may obtained and/or obtainable from: at least one building block comprising one or more polycarboxylic acid(s) and/or one or more anhydride(s) obtained and/or obtainable from one or more polycarboxylic acid(s); and at least one branching unit comprising at least one tri functional nitrogen atom where the at least one branching unit containing an end group comprising a polar moiety.

Suitable polycarboxylic acid(s) that may be used as and/or to prepare the building block(s) may conveniently be dicarboxylic acids such as $C_{2-12}$ hydrocarbon dicarboxylic acids; more conveniently linear di-acids and/or cyclic di-acids; and most conveniently linear di-acids with terminal carboxylic acid groups such as those selected from the group consisting of: saturated di-acids such as: 2-ethanedioic acid (oxalic acid); 3-propanedioic acid (malonic acid); 4-butanedioic acid (succinic acid); 5-pentanedioic acid (glutaric acid); 6-hexanedioic acid (adipic acid); 7-heptanedioic acid (pimelic acid); 8-octanedioic acid (suberic acid); combinations thereof; and mixtures thereof; and unsaturated di-acids such as: Z-(cis)-butenedioic acid (maleic acid); E-(trans)-butenedioic acid (fumaric acid); 2,3-dihydroxybutandioic acid (tartaric acid); combinations thereof; and/or mixtures thereof.

Useful hyper-branched polyester amides of and/or used in the present invention may be obtained and/or obtainable from at least one building block that comprises: optionally substituted $C_{2-30}$ hydrocarbon dioic acids and/or anhydrides thereof, combinations thereof on the same moiety; and/or mixtures thereof on different moieties;

More useful hyper-branched polyester amides of use in the present invention may be obtained and/or obtainable from at least one building block that comprises: $C_{4-16}$ alkenyl $C_{2-10}$ dioic anhydrides; $C_{4-16}$ cycloalkyl dicarboxylic acid anhydrides; $C_{2-10}$ alkane dioic anhydrides; phthalic anhydrides, combinations thereof on the same moiety and/or mixtures thereof on different moieties.

Most useful hyper-branched polyester amides of use in the present invention may be obtained and/or obtainable from at least one building block that comprises: dodecenyl (i.e. $C_{12}$ alkenyl) succinic (i.e. 4-butanedioic) anhydride; cyclohexane-1,2-dicarboxylic acid anhydride; succinic (i.e. 4-butanedioic) anhydride; combinations thereof on the same moiety; and/or mixtures thereof on different moieties.

Suitable branching units that may be used to prepare hyper-branched polyester amides of and/or used in the present invention may be any moiety capable of reacting with the building block and/or precursor therefor (such as any of those described herein) at three or more sites on the branching unit to form a three dimensional (branched) product. Branching units denote those units which form the core structure of the hyper-branched polyester amides and do not necessarily form end groups.

Branching units may comprise one or more polyoxyalkylene moiet(ies) comprises polyoxyalkylene repeat unit(s) for example suitable unsubstituted or substituted alkylene groups such as ethylene, propylene, butylene, and isobutylene. The polyoxyalkylene moiety comprising one or more of these repeat units can be a homo-, block or random polymer, or any suitable mixtures thereof. Preferred the average total number of repeat units in polyoxyalkylene moiet(ies) suitable for use in branching units herein is from 2 to 100, more preferably 5 to 60, most preferably 10 to 50, for example 16 or 45.

The end groups described herein may be selected from those described herein, such as two or more, preferably three or more most preferably four or more of any of the following end groups from types (i) to (v)

i) tertiary amine functional end groups (also denoted herein as (t-amine or A groups)

ii) quaternary ammonium functional end groups (also denoted herein as Q groups) preferably comprising tertiary amine groups that are protonated and quaternary ammonium cations that have four hydrocarbon substituents (preferably together not forming a ring) attached to a positively charged nitrogen atom (also denoted herein as QAC) more preferably QAC groups, iii) polyalkylene glycol functional end groups (also denoted herein as E groups), preferably polypropylene glycol and/or polyethylene glycol, more preferably polyethylene glycol groups (also denoted herein as EO groups); and iv) quaternary ammonium zwitterionic end groups, i.e., comprising zwitterions that have an anionic group (preferably carboxylate) attached to a positively charged nitrogen atom, more preferably betaine functional end groups (also denoted herein as BQ), most preferably one or more groups represented by formula

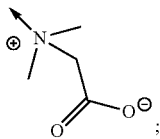

v) additional polar (anionic) end groups such as phosphates, sulfates and the like; and/or any mixtures and/or combinations thereof whether on the same or different macromolecule that comprises the polydisperse polyester amide.

Useful non hydroxyl functional hyper-branched polyester amides of and/or used in the present invention may be obtained and/or obtainable from:
at least one building block selected from the group consisting of:
  optionally substituted $C_{2-30}$ hydrocarbon dioic acid, anhydrides thereof;
  combinations thereof on the same moiety; and
  mixtures thereof on different moieties;

More useful hyper-branched polyester amides of use in the present invention may be obtained and/or obtainable from:
at least one building block selected from the group consisting of:
  $C_{4-16}$ alkenyl $C_{2-10}$ dioic anhydride;
  $C_{4-16}$ cycloalkyl dicarboxylic acid anhydride;
  $C_{2-10}$ alkandioic anhydride;
  combinations thereof on the same moiety; and
  mixtures thereof on different moieties.

The at least one building blocks as described herein may comprises at least one end group selected from the group consisting of:
  substituted nitrogen containing $C_{1-10}$ hydrocarbon;
  quaternized $C_{1-12}$ hydrocarbon (e.g. $C_{1-6}$ hydrocarbyl) substituted amino poly($C_{2-4}$ alkyenyloxy)$_n$ groups optionally terminated with an alkoxy group (e.g. $C_{1-4}$ alkoxy) where optionally n is from 15 to 50;
  quaternized carboxylate $C_{1-12}$ hydrocarbon (e.g. $C_{1-6}$ hydrocarbylcarboxylate) substituted amino
  optionally quaternized $C_{1-12}$ hydrocarbon (e.g. $C_{1-6}$ hydrocarbyl) substituted amino
  optionally neutralised carboxylic acid groups;
  optionally substituted nitrogen containing $C_{3-10}$ rings (such as morpholo);
  phosphates;
  sulfates
  combinations thereof on the same moiety; and
  mixtures thereof on different moieties.

Most useful functional hyper-branched polyester amides of use in the present invention may obtained and/or obtainable from:
at least one building block selected from the group consisting of:
  dodecenyl (i.e. $C_{12}$ alkenyl) succinic (i.e. 4-butanedioic) anhydride;
  cyclohexane-1,2-dicarboxylic acid anhydride;
  succinic (i.e. 4-butanedioic) anhydride;
  combinations thereof on the same moiety; and
  mixtures thereof on different moieties;
at least one branching unit selected from the group consisting of:
  diisopropanol amine; diethanolamine;
  trishydroxymethylene amino methane;
  combinations thereof on the same moiety; and
  mixtures thereof on different moieties;

Advantageously hyper-branched polyester amides of and/or used in the present invention may have a (theoretical) number average molecular weight ($M_n$) of from about 500 to about 50,000 g/mol; more advantageously from about 800 to about 30,000 g/mol; most advantageously from about 1000 to about 20,000 g/mol; even more particularly from about 1200 to about 17,000 g/mol.

The end group (or reagents and/or precursors therefore) may be introduced at any stage in the preparation of the polyester amide, though typically it is introduced at the beginning. The end group may be attached at any point to the molecule.

Specific examples of typical idealized structure of particular preferred hyper-branched polyester amide of and/or used in the present invention are given below.

The terms 'optional substituent' and/or 'optionally substituted' as used herein (unless followed by a list of other substituents) signifies the one or more of following groups (or substitution by these groups): carboxy, sulfo, sulfonyl, phosphates, phosphonates, phosphines, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulfonyl if directly attached to each other represent a sulfamoyl group). Preferred optional substituents comprise: carboxy, sulfo, hydroxy, amino, mercapto, cyano, methyl, halo, trihalomethyl and/or methoxy, more preferred being methyl and/or cyano. The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulfur, more preferably from hydrogen, nitrogen, oxygen, phosphorus and/or sulfur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulfinyl, sulfonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbon group' as used herein is a sub set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbon groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "RC"), formed by removing three hydrogen atoms from the same carbon atom of a hydrocarbon the free valencies of which are engaged in a triple bond (for example alkylidyne). Hydrocarbon groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbon group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbon species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non stoichiometric complexes, π adducts, solvates and/or hydrates); isotopically substituted forms, polymeric configurations [such as homo or copolymers, random, graft and/or block polymers, linear and/or branched polymers (e.g. star and/or side branched), cross linked and/or networked polymers, polymers obtainable from di and/or tri valent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polyester amides may also usefully exhibit other properties to be useful in inhibiting hydrates. For example the polyester amides may exhibit at least one of those desired properties described herein and/or any combinations thereof that are not mutually exclusive.

Useful polyester amide(s) may exhibit one or more improved propert(ies) (such as those described herein) with respect to known polyester amides. More usefully such improved properties may be in a plurality, most usefully three or more of those properties below that are not mutually exclusive.

Conveniently the polyester amide(s) may exhibit one or more comparable propert(ies) (such as those described herein) with respect to known polyester amides. More usefully such comparable properties may be in two or more, most usefully three or more, for example all of those properties below that are not improved and/or mutually exclusive.

Improved propert(ies) as used herein denotes that the value of one or more parameter(s) of the polyester amides of the present invention is >+8% of the value of that parameter for the reference described herein, more preferably >+10%, even more preferably >+12%, most preferably >+15%.

Comparable properties as used herein means the value of one or more parameter(s) of the polyester amides of the present invention is within +/−6% of the value of that parameter for the reference described herein, more preferably +/−5%, most preferably +/−4%.

The known reference polyester amide for these comparisons is comparative example COMP 1 (prepared as described herein) used in the same amounts (and where appropriate in the same compositions and tested under the same conditions) as polyester amides of the invention being compared.

The percentage differences for improved and comparable properties herein refer to fractional differences between the polyester amide of the invention and the comparative example COMP 1 (prepared as described herein) where the property is measured in the same units in the same way (i.e.

if the value to be compared is also measured as a percentage it does not denote an absolute difference).

It is preferred that polyester amides of the invention (more preferably hyper-branched polyester amides) have improved utility in inhibiting hydrates as described herein (measured by any suitable parameter known to those skilled in the art) compared to the comparative example COMP 1 (prepared as described herein).

Many other variations embodiments of the invention will be apparent to those skilled in the art and such variations are contemplated within the broad scope of the present invention.

Further aspects of the invention and preferred features thereof are given in the claims herein.

The hyper-branched polyester amide compounds can be added to the mixture of low-boiling hydrocarbons and water as their dry powder, or, preferably in concentrated solution. They can also be used in the presence of other hydrate crystal growth inhibitors.

It is also possible to add other oil-field chemicals such as corrosion and scale inhibitors to the mixture containing the hyper-branched polyester amide compounds. Suitable corrosion inhibitors comprise primary, secondary or tertiary amines or quaternary ammonium salts, preferably amines or salts containing at least one hydrophobic group. Examples of corrosion inhibitors comprise benzalkonium halides, preferably benzyl hexyldimethyl ammonium chloride.

EXAMPLES

Test Methods

Method to Determine Cloud Point

For determining the cloud point of the polyester amides the following procedure was followed.

In a 50 ml glass vial was weighted 140 mg of the polymer to which was added water or a brine solution to a total weight of 20 g In the case of amine containing polyester amides the pH was adjusted with 5 t % w/w HCl solution to the desired pH value. A Teflon coated stirrer bar was added to the vial and a thermocouple was immersed in the solution for at least 1 cm, approximately in the middle of the vial. The vial was placed on a stirrer/heater and the temperature was gradually increased while stirring. The solution was observed visually while warming and the cloud point was indicated by the first sign of cloudiness of the solution.

Composition Salt Solution (Also Referred to Herein as BRINE)

For the determination of the cloud point in brine solutions the following salt composition was made: 140 g sodium chloride; 30 g calcium chloride.6$H_2O$; 8 g magnesium chloride.6$H_2O$. The salts were dissolved in 1 liter of demineralized water. The pH of the solution was adjusted to 4 (or another desired pH as specified) with 0.1M hydrochloric acid solution.

Examples

The present invention will now be described in detail with reference to the following non limiting examples which are by way of illustration only. These examples are highly branched polyester-amides containing a combination of at least two, preferably three, more preferably four oft-amine (also denote as A), quaternary (also denote as Q) polyethylene oxide (also denoted as EO) and/or betaine (also denoted as BQ) functional end groups. Such Hybranes are also referred to herein combo-functional Hybranes and include combinations with other functional end groups other than A, Q, EO and/or BQ.

Examples 1 to 4

Preparation of Highly Branched Polyester Amides Containing Tert Amine and Polyethylene Glycol End Groups Example 1

A double walled glass reactor, which can be heated by means of thermal oil, fitted with a mechanical stirrer, a distillation head, a vacuum and nitrogen connection was heated to 60° C. The reactor is charged with 209.2 g of hexahydrophthalic anhydride and 462.5 g of polyethyleneglycol monomethyl ether with average molecular weight of 750 was added. The temperature was increased to 120° C. and the reaction mixture was stirred for 45 minutes. 46.1 g of N,N-bis(N'N'-dimethylaminopropyl)amine and 82.1 g of diisopropanolamine were added and the temperature was further increased to 180° C. After approximately 1 hour the pressure was gradually reduced to a final pressure of <10 mbar to distil off reaction water. Heating and vacuum were maintained until the residual carboxylic acid content was <0.3 meq/g (tritrimetrical analysis) to obtain, as a product, Example 1 which was characterised as follows:
AV=12.4 mgKOH/g. Amine content=0.52 meq/g (tritrimetrical analysis). Molecular weight Mn=6290

Example 2

An analogous procedure was followed to that described in Example 1 using the following amounts of starting materials: 194.5 g of hexahydrophthalic anhydride, 480.6 g of polyethyleneglycol monomethyl ether with average molecular weight of 1000, 44.9 g of N,N-bis(N'N'-dimethylaminopropyl)amine and 80.0 g of diisopropanolamine to obtain, as a product, Example 2 which was characterised as follows: AV=5.0 mgKOH/g, amine content=0.52 meq/g. Molecular weight Mn=13000

Example 3

An analogous procedure was followed to that described in Example 1 using the following amounts of starting materials: 194.2 g of hexahydrophthalic anhydride, 449.8 g of polyethyleneglycol monomethyl ether with average molecular weight of 1000, 84.1 g of N,N-bis(N'N'-dimethylaminopropyl)amine and 71.9 g of diisopropanolamine to obtain, as a product, Example 3 which was characterised as follows: AV=6.7 mg KOH/g, amine content=0.52 meq/g. l Molecular weight Mn=4320

Example 4

An analogous procedure was followed to that described in Example 1 using the following amounts of starting materials: 311.1 g of dodecenylsuccinic anhydride instead of hexahydrophthalic anhydride, 238.8 g of polyethyleneglycol monomethyl ether with average molecular weight of 750, 79.4 g of N,N-bis(N'N'-dimethylaminopropyl)amine and 70.7 g of diisopropanolamine to obtain, as a product, Example 4 which was characterised as follows:

AV=7.5 mg KOH/g, amine content=1.16 meq/g. Molecular weight Mn=6300

Examples 5 and 6

Preparation of Highly Branched Polyester Amides Containing Amine, Cyclic Amides and Polyethylene Glycol End Groups Example 5

A double walled glass reactor, which can be heated by means of thermal oil, fitted with a mechanical stirrer, a distillation head, a vacuum and nitrogen connection was heated to 60° C. The reactor is charged with 172.9 g of hexahydrophthalic anhydride. 38.2 g of N,N-bis(N'N'-dimethylaminopropyl)amine and 26.6 g of morpholine and 394.4 g of polyethyleneglycol monomethyl ether with average molecular weight of 2000 were added. The reaction mixtures was stirred for 1 hour at 60° C. after which the temperature was raised to 120° C. 67.9 g of diisopropanolamine was added. The reaction mixture was stirred for 1 hour after which the further increased to 180° C. After approximately 1 hour the pressure was gradually reduced to a final pressure of <10 mbar to distil off reaction water. Heating and vacuum were maintained until the residual carboxylic acid content was <0.3 meq/g (tritrimetrical analysis) to obtain, as a product, Example 5 which was characterised as follows:
AV=15.0 mgKOH/g. Amine content=0.52 meq/g (tritrimetrical analysis). Molecular weight Mn=6670

Example 6

An analogous procedure was followed to that described in Example 5 using the following amounts of starting materials: 132.3 g of hexahydrophthalic anhydride, 474.4 g of polyethyleneglycol monomethyl ether with average molecular weight of 2000, 22.9 g of N,N-bis(N'N'-dimethylaminopropyl)amine, 21.4 g of morpholine and 49.0 g of diisopropanolamine to obtain, as a product, Example 6 which was characterised as follows: AV=4.6 mgKOH/g, amine content=0.41 meq/g. Molecular weight Mn=5580

Examples 7 to 10

Preparation of Highly Branched Polyester Amides Containing Polyethylene Glycol and Betaine Functional End Groups and Optionally Other End Groups Example 7

The product obtained in Example 1 (175 g) was dissolved in 175 g of water. 36.2 sodium chloro acetate and 36.2 g of water were added. The reaction mixture was stirred at 80° C. until $^1$H-NMR analysis shows a complete conversion of the chloroacetate to obtain as product, Example 7.

Example 8

An analogous procedure was followed to that described in Example 7 using the product obtained in example 2 to obtain as product, Example 8.

Example 9

An analogous procedure was followed to that described in Example 7 using the product obtained in example 5 to obtain as product, Example 9.

Example 10

An analogous procedure was followed to that described in Example 7 using the product obtained in Example 6 to obtain as product, Example 10.

TABLE 1

| | Cloud points | | | |
|---|---|---|---|---|
| | Cloud point (° C.) | | | |
| | DMW | | BRINE | |
| Example | pH = 4 | pH = 9 | pH = 4 | pH = 9 |
| Ex 1 | 93 | | 49 | |
| Ex 2 | >100 | 85 | 59 | 49 |
| Ex 3 | >100 | 73 | 63 | 47 |
| Ex 4 | >100 | | 55 | |
| Ex 5 | >100 | | 61 | |
| Ex 6 | >100 | | 60 | |
| Ex 7 | 95 | | 54 | |
| Ex 8 | >100 | | 60 | |
| Ex 9 | >100 | | 61 | |
| Ex 10 | >100 | | 58 | |

COMPARATIVE EXAMPLES

Preparation of Highly Branched Polyester Amides Containing Hydroxy End Groups

Comp 1

A double walled glass reactor, which can be heated by means of thermal oil, fitted with a mechanical stirrer, a distillation head, a vacuum and nitrogen connection, is charged with 192.5 g of succinic anhydride. The reactor was heated to 125° C. When the succinic anhydride has melted 307.5 g of diisopropanolamine was added. The reaction mixture was stirred for 1 hour and then the temperature was raised to 160° C. Over a period of 4 hours the pressure was gradually reduce to a final pressure of <10 mbar to distil off reaction water. Heating and vacuum were maintained until the residual carboxylic acid content was <0.2 meq/g (tritrimetrical analysis). Molecular weight Mn=1200.
AV=5.2 mgKOH/g Comp 2

A double walled glass reactor, which can be heated by means of thermal oil, fitted with a mechanical stirrer, a distillation head, a vacuum and nitrogen connection, is charged with 245.5 g of hexahydrophthalic anhydride. The reactor was heated to 80° C. When the anhydride has melted 254.5 g of diisopropanolamine was added. The reaction mixture was stirred for 1 hour and then the temperature was raised to 160° C. Over a period of 4 hours the pressure was gradually reduce to a final pressure of <10 mbar to distil off reaction water. Heating and vacuum were maintained until the residual carboxylic acid content was <0.2 meq/g (tritrimetrical analysis). Molecular weight Mn=1500. AV=6.4 mgKOH/g

TABLE 2

Comparative examples - cloud points

| Example | Cloud point (° C.) DMW pH = 4 | Cloud point (° C.) BRINE pH = 4 |
|---|---|---|
| Comp 1' | 84 | 14 |
| Comp 2' | insoluble | insoluble |

Kinetic Hydrate Inhibition Effect

The ability of different polyester amide compounds comprising at least one ammonium functional end group to prevent hydrate formation was tested by using a "rolling ball apparatus". The rolling ball apparatus basically comprises a cylindrical cell that contains a stainless steel ball, which can freely roll back and forth over the entire (axial) length of the cell when the cell is tilted. The cell is equipped with a pressure transducer to allow a reading of the gas pressure in the cell and some auxiliary tubing to facilitate cleaning and filling of the cell. The total volume of the cell (including auxiliary tubing) is 46.4 ml. After being filled (a at a pre-defined temperature that is higher than the hydrate dissociation temperature) with water and/or a polyester amide compound and/or condensate or oil, the cell is pressurized to a pre-defined pressure with a synthetic natural gas with a known composition. A set of 24 separate cells, each containing the same or different contents can be mounted horizontally in a rack that is placed in a thermally insulated container through which a water/glycol mixture is circulated. The temperature of the water/glycol mixture can be carefully controlled with an accuracy better than one tenth of a degree Celsius. During the entire experiment, the main body of each cell (i.e., the cylinder) remains submersed in the water/glycol mixture. The entire assembly (cells plus rack plus insulated container) is mounted on an electrically powered seesaw, which, when activated, causes the stainless steel balls to roll back and forth over the entire length of the cells once every eight seconds.

Stagnant pipeline shut-in conditions are simulated by leaving the cells stationary (in horizontal position) during a pre-determined period. Flowing pipeline conditions are simulated by switching on the seesaw such that the balls continuously agitate the liquid contents of the cells.

The ability of some polyester amide compounds to prevent hydrate formation (kinetic inhibition effect) under flowing conditions was tested during the following rolling ball experiments.

Comparative Example 3

Blank Experiment

At 24° C., 12 g of demineralized water at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.4° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.4° C. In this experiment hydrates were formed after 1 hour.

Comparative Example 4

Citric Acid

At 24° C., 12 g of demineralized water, with 1.5 wt % of citric acid, at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.6° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.2° C. This experiment was carried out in duplicate and in both tests, hydrates were formed in less than 1 hour.

Comparative Example 5

Highly Branched Polyester Amide

At 24° C., 12 g of demineralized water, with 0.9 wt % of a highly branched polyester amide not containing ammonium end groups, at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.4° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.4° C. In this experiment hydrates were formed after 1.1 hours.

Comparative Example 6

Highly Branched Polyester Amide

At 24° C., 12 g of demineralized water, with 0.9 wt % of a highly branched polyester amide not containing ammonium end groups, at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.4° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.4° C. In this experiment hydrates were formed after 1.2 hours.

Example 11

Polyester Amide Compound with Polyalkylene Glycol and Quaternary Ammonium End Groups At 24° C., 12 g of demineralized water, with 0.9 wt % of a highly branched polyester amide containing polyalkylene glycol and quaternary ammonium end groups, at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.4° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.4° C. This experiment was carried out four times. In all of the tests, no hydrates were formed during the testing time of 141 hours.

Example 12

Polyester Amide Compound with Quaternary Ammonium Zwitterionic and Polyalkylene Glycol End Groups At 24° C., 12 g of demineralized water, with 0.9 wt % of a highly branched polyester amide containing quaternary ammonium zwitterionic and polyalkylene glycol end groups, at a pH of 4 was added to the testing cell in the rolling ball apparatus. Then the cell was pressurized with Gas 1 and the mixture was equilibrated such that at 24° C., the pressure in the cells was 79.1 barg. The cell was mounted on the rack and subsequently immersed in the water/glycol mixture and brought to a temperature of 9.4° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 17.8° C., so this experiment was carried out at a subcooling of 8.4° C. This experiment was carried out in duplicate. In these tests, no hydrates were formed during the testing time of 208 hours.

At 20° C., 3.6 g of demineralized water, at a pH of 4 was added to the testing cell in the rolling ball apparatus. 8.4 ml (6.38 g) of condensate were added to the cell. In addition, 0.9 wt % of a highly branched polyester amide containing quaternary ammonium zwitterionic and polyalkylene glycol end groups was added. Then the cell was pressurized with Gas 2 and the mixture was equilibrated such that at 20° C., the pressure in the cells was 36 barg. The cell was mounted on the rack and subsequently immersed in the water/glycol mixture and brought to a temperature of 2.0° C. The seesaw was activated such that the stainless steel balls rolled back and forth over the entire (axial) length of the cells once every eight seconds. The pressure in the cells was monitored to determine when hydrates were formed. Hydrate formation is characterized by a sharp decline in pressure. It is calculated that hydrates can form under these conditions at a temperature of 11.0° C., so this experiment was carried out at a subcooling of 9.0° C. This experiment was carried out in duplicate. In one test, hydrates formed at 280 hours and in the other test, no hydrates formed during the testing time of 338 hours.

The invention claimed is:

1. A method for inhibiting the plugging of a conduit containing a flowable mixture comprising at least an amount of hydrocarbons capable of forming hydrates in the presence of water and an amount of water, which method comprises:
adding to the mixture an amount of a functionalized dendrimer effective to inhibit formation and/or accumulation of hydrates in the mixture at conduit temperatures and pressures, wherein the functionalized dendrimer comprises two or more functional end groups selected from the group consisting of quaternary ammonium functional end groups, polyalkylene glycol functional end groups, quaternary ammonium zwitterionic end groups, and phosphate or sulfate end groups and
flowing the mixture containing the functionalized dendrimer and any hydrates through the conduit.

2. The method of claim 1 wherein the functionalized dendrimer is a hyper-branched polyester amide.

3. The method of claim 1 in which between about 0.05 to about 10 wt % of the functionalized dendrimer, based on the amount of water in the hydrocarbon-containing mixture is added to the mixture.

4. The method of claim 1 wherein the functionalized dendrimer has a cloud point of at least 50° C. in brine.

5. The method of claim 1 wherein the functionalized dendrimer has a cloud point of at least 80° C. in brine.

6. The method of claim 1 wherein the functionalized dendrimer comprises three or more functional end groups selected from the group consisting of quaternary ammonium functional end groups, polyalkylene glycol functional end groups, quaternary ammonium zwitterionic end groups, and phosphate or sulfate end groups.

* * * * *